US010318511B2

(12) United States Patent
De Smet et al.

(10) Patent No.: US 10,318,511 B2
(45) Date of Patent: Jun. 11, 2019

(54) EXPRESSION TREE INTERNING

(71) Applicant: Microsoft Technology Licensing, LLC, Redmond, WA (US)

(72) Inventors: Bart De Smet, Bellevue, WA (US); Eric Anthony Rozell, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 868 days.

(21) Appl. No.: 14/952,589

(22) Filed: Nov. 25, 2015

(65) Prior Publication Data

US 2017/0147621 A1    May 25, 2017

(51) Int. Cl.
| | | |
|---|---|---|
| *G06F 7/00* | (2006.01) | |
| *G06F 16/22* | (2019.01) | |
| *G06F 16/2455* | (2019.01) | |
| *G06F 16/901* | (2019.01) | |
| *G06F 17/30* | (2006.01) | |
| *G06F 16/2453* | (2019.01) | |
| *G06F 16/2452* | (2019.01) | |

(52) U.S. Cl.
CPC ...... *G06F 16/2246* (2019.01); *G06F 16/2255* (2019.01); *G06F 16/24524* (2019.01); *G06F 16/24542* (2019.01); *G06F 16/24552* (2019.01); *G06F 16/9014* (2019.01); *G06F 17/3033* (2013.01); *G06F 17/3048* (2013.01); *G06F 17/30327* (2013.01)

(58) Field of Classification Search
CPC .................................................. G06F 16/9014
See application file for complete search history.

(56) References Cited

U.S. PATENT DOCUMENTS

| | | | |
|---|---|---|---|
| 6,098,080 A | 8/2000 | Endicott et al. | |
| 6,839,725 B2 | 1/2005 | Agesen et al. | |
| 7,072,919 B2 | 7/2006 | Sexton et al. | |
| 7,805,710 B2* | 9/2010 | North | G06F 9/45516 711/118 |
| 7,913,163 B1* | 3/2011 | Zunger | G06F 17/30864 715/234 |
| 2008/0065689 A1 | 3/2008 | Burka et al. | |

(Continued)

OTHER PUBLICATIONS

"International Preliminary Report on Patentability Issued in PCT Application No. PCT/US2016/062383", dated Feb. 20, 2018, 12 Pages.

(Continued)

*Primary Examiner* — Ajith Jacob

(57) ABSTRACT

In non-limiting examples of the present disclosure, systems and methods for interning expression trees are provided. Hash code for a plurality of expression tree nodes is recursively computed and a determination is made as to whether hash code for each of a plurality of expression tree nodes is stored in a cached intern pool. Upon determining that at least one of a plurality of expression tree nodes is not stored in a cached intern pool, one or more functions may be run on at least one of a plurality of expression tree nodes for determining whether at least one of a plurality of expression tree nodes should be stored in a cached intern pool. Normalization of expression trees may also be employed to effectuate effective sharing of expression tree nodes.

20 Claims, 9 Drawing Sheets

(56) References Cited

U.S. PATENT DOCUMENTS

| | | |
|---|---|---|
| 2008/0243908 A1 | 10/2008 | Aasman et al. |
| 2010/0198799 A1 | 8/2010 | Krishnan et al. |
| 2011/0145785 A1 | 6/2011 | Centonze et al. |
| 2012/0124106 A1 | 5/2012 | Allen et al. |
| 2013/0268921 A1 | 10/2013 | Brauneis et al. |
| 2013/0328898 A1 | 12/2013 | Murthy et al. |
| 2014/0201838 A1 | 7/2014 | Varsanyi et al. |
| 2014/0258307 A1 | 9/2014 | West et al. |

OTHER PUBLICATIONS

"Cache Replacement Policies", Retrieved from<<https://en.wikipedia.org/w/index.php?title=Cache replacement_policies&oldid=673595777>>, 5 Pages.

Elarag, Hala, "Web Proxy Cache Replacement Strategies", Simulation, Implementation, and Performance Evaluatio, In Book of SpringerBriefs in Computer Science Series ,5 Pages.

"Second Written Opinion Issued in PCT Application No. PCT/US2016/062383", dated Aug. 17, 2017, 8 Pages.

PCT International Search Report and Written Opinion in International Application PCT/US2016/062383, dated Jan. 30, 2017, 15 pgs.

Wong, Phillip et al., "SCHEME: Caching subtrees in genetic programming", Evolutionary Computation, SES 2008, (IEEE World Congress on Computational Intelligence); Piscataway, NJ, USA, Jun. 1, 2008, pp. 2678-2685.

Anonymous, "De Bruijn index", Wikipedia, Jun. 7, 2015, 1 page, retrieved on Jan. 19, 2017 from: URL: https://en.wikipedia.org/w/index/php?title=De_Bruijn_index&oldid=665899067.

N.G. De Bruijn, "Lambda Calculus Notation With Nameless Dummies, A Tool for Automatic Formula Manipulation, With Application to the Church-Rosser Treorem", Indagationes Mathematicae (Proceedings), vol. 75, Jun. 24, 1972, pp. 381-392.

M, Harald, "Movimentum—Three basic algorithms: Constant Folding", Published on: Jun. 26, 2012 Available at: http://swemusings.blogspot.in/2012/06/movimentum-three-basic-algorithms.html, 4 pages.

"Expression Tree Normalization—How Many Ways to Say "STRING == STRING"?", Published on: Aug. 13, 2008 Available at: http://bartdesmet.net/blogs/bart/archive/2008/08/13/expression-tree-normalization-how-many-ways-to-say-string-string.aspx, 10 pages.

Stellman, Andrew, "Understanding C#: String,Intern makes strings interesting", Published on: Aug. 22, 2010 Available at: http://broadcast.oreilly.com/2010/08/understanding-c-stringintern-m.html, 8 pages.

\* cited by examiner

EXPRESSION TREE INTERNING

BACKGROUND

Data is generally retrieved from a database using queries composed of expressions that are written in a language that declaratively specifies what is to be retrieved. Such expressions are typically processed by a query processor, which is used to determine the query's execution plan, that is, the sequence of steps that will be taken to retrieve the requested data. Within this data retrieval framework, query operators may be utilized to map to lower-level language constructs and/or expression trees, making the process of data retrieval more efficient.

It is desirable to provide techniques to provide mechanisms by which shared expressions amongst expression trees may be utilized to minimize the costs associated with processing a large number of queries that contain the same semantics within their data structures. It is with respect to this general technical environment that aspects of the present technology disclosed herein have been contemplated. Furthermore, although a general environment and relatively specific problems have been discussed, it should be understood that the examples described herein should not be limited to the general environment or to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems, methods, and techniques that enable interning of sharable expression tree nodes and the corresponding hash code for the nodes contained within potentially sharable expression trees. A determination of whether one or more of the expression tree nodes and their corresponding hash code is stored in a cache may be made. Further, upon determining that at least one of a plurality of expression tree nodes and/or the corresponding hash code for those nodes is stored in a cache, one or more functions may be run on the expression tree nodes for determining whether at least one of the plurality of expression tree nodes and/or their corresponding hash code is desirable for sharing.

BRIEF DESCRIPTION OF THE DRAWINGS

Non-limiting and non-exhaustive examples are described with reference to the following figures.

DETAILED DESCRIPTION

Figure 1:
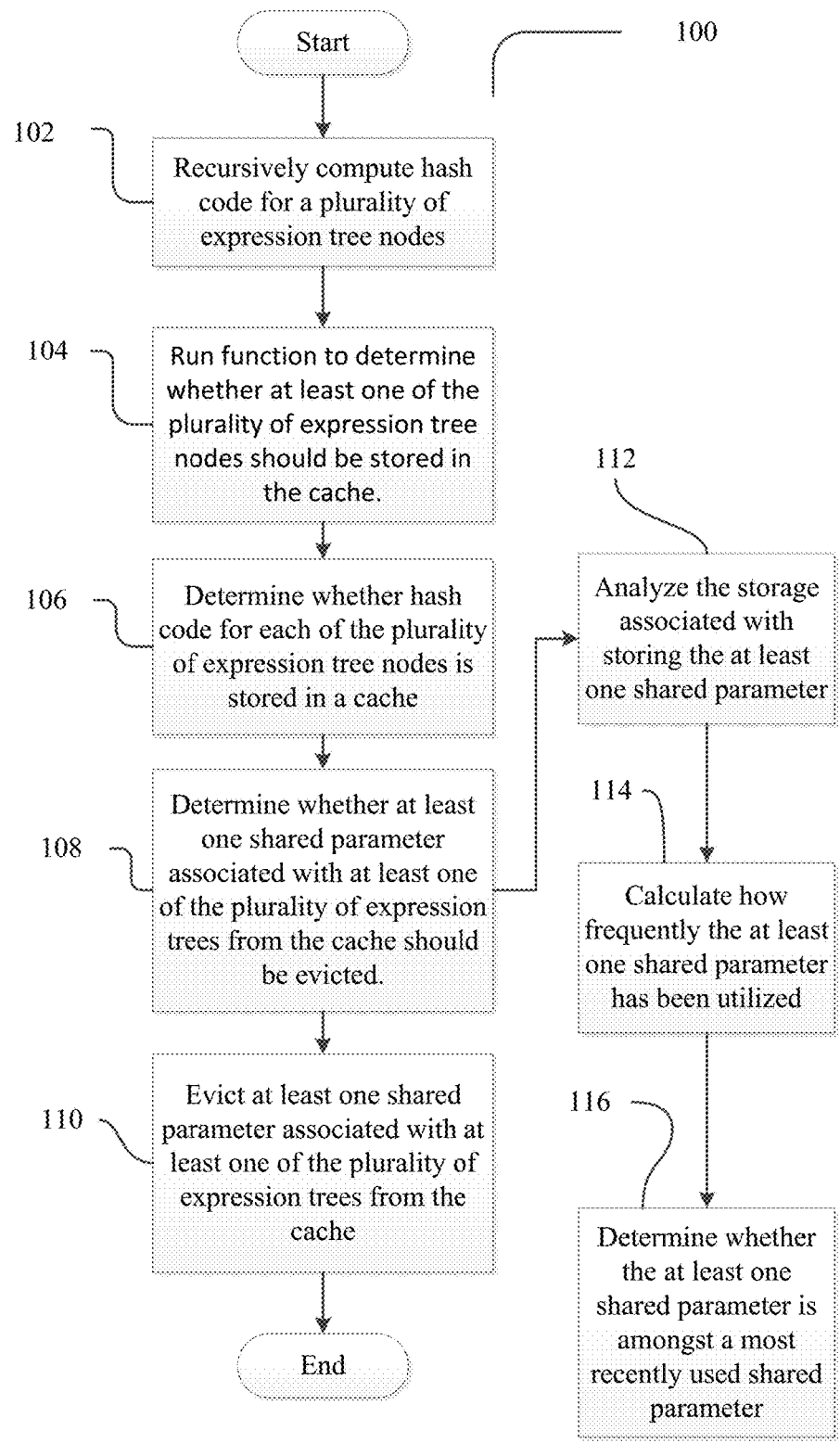
FIG. 1 is an exemplary method for interning expression trees.

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Data is generally retrieved from a database using queries composed of expressions that are written in a language that declaratively specifies what is to be retrieved. Such expressions are typically processed by a query processor, which is used to determine the query's execution plan, that is, the sequence of steps that will be taken to retrieve the requested data. Within this data retrieval framework, query operators may be mapped onto expression trees, making the process of data retrieval more efficient.

Virtual Execution Systems (VES) or Virtual Machines (VMs) like the Common Language Runtime (CLR) provide a framework for interning types that have immutable characteristics. Interning may refer to the storing of data for later reuse. For example, data that is likely to be reused by multiple different constructs may be interned so that the other constructs can reuse the data without having to create an additional copy of the data. Interning of such data may also include storing the data in a cache. One example of such a type is a string. Strings are treated as immutable in the CLR. Therefore, programs containing many string literals that have the same contents can obtain a reduction in the working set required. However, strings that are computed at runtime are not generally interned by default. Explicit calls to an intern method may be required to consider a string for interning. Interning strings reduces the cost of computing string equality across the string intern pool for each newly created string, which may be a temporary allocation anyway. For example, when computing the string (s1+s2)+s3, the string allocated to represent "s1+s2" only lives for a short while, until it gets appended by "s3", resulting in a whole different string object.

According to additional non-limiting examples of the present disclosure, systems, methods, and devices are provided that enable interning of shared nodes (e.g., shared expressions or shared subtrees) within one or more expression trees corresponding to multiple data queries that share features that overlap amongst one another. As used herein, a node may refer to a single node (e.g. a leaf) or multiple nodes (e.g., a subtree). Expression trees are data structures representing executable code or queries. Quite often, these data structures are built in an immutable fashion, which, among other benefits, provides for reducing the costs of type checking (no changes can lead to a need to redo the checking), sharing of trees or parts thereof across multiple threads of execution, etc. These characteristics of expression trees may be leveraged to perform interning which allows for sharing of trees that have the same semantics, therefore reducing the amount of memory needed, reducing time needed when comparing equality of expressions, and reducing resource consumption related to compilation and evaluation of the expressions. In further examples, interning of expression tees provides the ability to share the characteristics, properties, and prior work performed on an interned expression tree. For example, interning a tree provides for sharing results of running an expensive analysis over the tree. Among other uses, interning trees may provide efficiencies with respect to compilation, determining unbound values in an expression which involves a traversal of the tree, etc. In examples, performing interning and normalization as described herein early in a request pipeline provides the ability to share data, results, etc. during the later operations of the pipeline.

What follows is a description relating to expression tree utilization. The description is not intended to limit the scope of the claims, but rather to facilitate clarity and understanding regarding aspects of the disclosure.

Expression trees represent code in a tree-like structure composed of nodes, where each node within the tree-like data structure is an expression—for example a method call or a binary operation such as x<y. Expression trees are typically constructed using subtrees such that various different subtrees can be combined into a larger tree. Therefore, if a subtree can be made shareable, benefits can be realized across a larger tree or network or network of subtrees such as, for example, providing the ability to reuse subtrees as part of different expression trees. The mechanism to share subtrees lends itself well for utilization with an "online" process, e.g., executing in a distributed network. In examples, interning expression trees provides for the sharing of subtrees with various different trees that share similar semantics. As such, among other benefits, the amount of memory needed to store various different trees is reduced.

Utilization of expression trees in a multi-query environment may be useful for eliminating unnecessary memory storage costs associated with processing a large number of queries that may share certain features that overlap within their data structure. Expression tree interning may be utilized to process a large number of queries, whereby entire queries, or pieces of those queries that share certain characteristics, as represented by their expression tree data structure (e.g., the expressions within those trees as represented by subtrees or individual nodes and the mapped structure of those nodes within the expression tree query structure) may be shared and stored in memory by way of the interning process.

In non-limiting examples of the present disclosure, expression tree nodes may be recursively traversed utilizing expression tree visitors to allow for interning of nodes within expression trees and/or hash codes that represents the expressions within those nodes. In examples, a visitor may be a common pattern that can be applied during tree traversal and/or manipulation. For example, a tree visitor may visit a node in a tree and, depending on the properties of the node (e.g., its type, its value, etc.) may perform an operation on the node (e.g., a manipulation). In further examples, the visitor may also recursively visit the child nodes. Expression tree interning allows for sharing of expressions amongst multiple queries that contain the same semantics within their data structures. As will be understood by those of skill in the art, expression trees are typically built in an immutable fashion (that is, they cannot be modified directly), and therefore to modify an expression tree a copy of an existing expression tree may be created and modified by utilizing a visitor which traverses the copied expression tree and its corresponding nodes while modifying one or more of the nodes within the copy of the expression tree as it is traversed. As used herein, these visitors are components configured to visit, or in other words traverse, an object graph, for example recursively. For each object visited, the function structure may be construed to enable further action to be taken. The immutable characteristic of expression trees provides benefits associated with processing a large number of queries, such as reducing costs associated with type checking.

Expression trees may be used for the compiling and/or execution of code that is represented by the expression tree structure. Among other examples, use of expression trees enable dynamic modification of executable code, provides for the execution of queries in various databases, and/or the creation of dynamic queries. In general, these methods operate on sequences.

Standard query operators differ in the timing of their execution, depending on whether they return a singleton value or a sequence of values. Those methods that return a singleton value (for example, Average and Sum) execute immediately. Methods that return a sequence defer the query execution and return an enumerable object. Standard query operator methods that perform aggregation operations include: Aggregate, which performs a custom aggregation operation on the values of a collection; Average, which calculates the average value of a collection of values; Count, which counts the elements in a collection, optionally only those elements that satisfy a predicate function; LongCount, which counts the elements in a large collection, optionally only those elements that satisfy a predicate function; Min, which determines the minimum value in a collection; and Sum, which calculates the sum of the values in a collection. While specific operators are described herein, one of skill in the art will appreciate that other operators (e.g., Max, Min, etc.) may be employed with the aspects disclosed herein without departing from the scope of this disclosure.

In the case of methods that operate on in-memory collections, the returned enumerable object may capture the arguments that were passed to the method. When that object is enumerated, the logic of the query operator is employed and the query results are returned. Alternatively, methods may be employed which do not implement querying behavior, but instead build an expression tree that represents a query.

Certain queries, such as Language-Integrated Query (LINQ), not only provide a way of retrieving data, but also provide a powerful tool for transforming data. By using such queries, a source sequence may be utilized as input and modified in various ways to create a new output sequence. Such queries allow for performing functions such as merging multiple input sequences into a single output sequence that has a new name; creating output sequences whose elements consist of only one or several properties of each element in the source sequence; creating output sequences whose elements consist of the results of operations performed on the source data; creating output sequences in a different format, and creating output sequences that contain elements from more than one input sequence. Such operators are typically mapped onto expression trees.

Interning expression trees may require determining inequality between two expressions (e.g., source code, queries, etc.). In examples a process to hash tree nodes may be employed to identify inequality amongst the expressions represented by tree nodes. In examples, inequality amongst expression trees may refer to differences between the two expression trees (e.g., the identification of different nodes or subtrees) while equality may refer to shared characteristics of two expression trees (e.g., the identification of similar nodes or subtrees). As such, inequality checking may include a scan of a related-group of expression trees (e.g., a scan of two or more expression trees) relating to unique queries to determine whether hash collisions may occur. In examples, a hash code may be selected that results in unique hash codes for larger trees with many tree nodes. For example, for some 100 different tree node types (add, multiply, negate, member lookup, method call, etc.), it suffices to reserve 7 bits to prevent false conclusions where nodes of different kinds have equal hash codes. One of skill in the art will appreciate that various hash processes may be employed without departing from the scope of this disclosure.

In examples, a hash for a particular tree node may include a combination of the hash values for child nodes of the particular tree node. As such, if a tree is constructed during hashing, the hash codes of child nodes may be reused without having to be recomputed, thereby resulting in processing efficiencies. The computed hash codes may be saved in various different manners. For example, the data structure representing the tree may be used to save the hash codes. Alternatively, a hash table may be constructed to save the hash values for a tree. By reusing portions of expression tree (e.g., subtrees or nodes) for example, through interning the portions of the tree, when an expression trees is formed the child nodes may be composed and their respective hash codes recomputed during the composition. As such, an isomorphic API may be utilized such that the hash codes previously computed for the shared portion of the expression tree are used during the construction of a new expression tree or the transformation of an existing expression tree. As such, determination of hash codes related for a particular expression tree may be performed during the construction of the particular expression tree without having to re-compute hash codes for the expression tree. In some instances, hash codes for the entire expression tree may be determined without computation, for example, if the entire expression tree can be composed using interned expression trees or nodes. In other instances, hash codes for one or more portions of the expression tree may be computed, for example if portions of the expression tree can be composed using interned expression trees or nodes.

Because the hash code for a tree node is a combination of the hash codes of the tree nodes child nodes. As such, the hash codes for the child nodes may be reused when an expression tree is constructed during a hashing process. In one example, the data structure representing the expression tree may store hash values. Under such circumstances, the hash codes for the child nodes may be retrieved from the tree structure itself. In other examples where the expression tree data structure does not store hash codes, the previously computed hash codes for child nodes may be received from an external source, such as a hash table, a database, or another object.

In further examples, an algebra may be constructed for trees. Use of an algebra may provide the ability to access, transform, and/or store different tree data structures. An interface may be used to build such an algebra. Exemplary interfaces may be used to lift any tree data structure into a common type. The following is an example of such an interface:

```
interface ITree<out T>
{
  T Node { get; }
  IReadOnlyList<ITree<T>> Children { get; }
}
```

In examples, an ITree<T> interface may be used to build structures (e.g., combinators) that may be used to transform trees. Exemplary combinators are discussed in more detail below.

According to the modification principles of expression trees as described above (e.g., using an algebra, an interface, etc.), mechanisms may be provided according to aspects of this disclosure by which combinators may be built for transforming expression trees. For example, a library may be constructed that includes standard query operators (SQOs) that may be used to perform transformations on one or more expression trees and their subparts. In accordance with aspects disclosed herein, exemplary combinators for transforming trees may include one or more of the following as set forth in the Table 1.

TABLE 1

| COMBINATOR | FUNCTION | TRANSFORMATION PERFORMED |
| --- | --- | --- |
| Projection | Select | Projection using "Select" transforms an ITree<T> to an ITree<R>, e.g., to turn values T into Tuple<T, Trivia> |
| Filtering | Where | Filtering using "Where" may be utilized to prune nodes out of an ITree<T>, e.g., to remove redundant computations |
| Sorting | OrderBy | Sorting using "OrderBy" can percolate trees according to "keys" selected for nodes", e.g, to build priority queues |
| Aggregating | Aggregate | Aggregations using "Aggregate" can compute a value over a tree, e.g., the total cost of a tree, a hash code, etc. |
| Grouping | GroupBy | Grouping using "GoupBy" may be utilized to classify tree nodes and build indexes over nodes that have common keys |

As an example, the following function may be utilized to transform a tree of type ITree<T> into an ITree<Tuple<T, int>>, where the integer value associated with the node represents its hash code. A bottom-up tree visitor can tag intermediate nodes of a tree with their hash code, and roll up this information to parent nodes:
ITree<R>Select<T, R>R>(ITree<T>tree, Func<T, R>selector)

In certain aspects, Projection may be the process of taking an input tree, such as an expression tree, and transforming the input tree into a different tree. For example, given a variable such as 'ITree<T> tree', which represents a tree, and we apply projection the variable, for example, 'tree.Select(node=>Tuple.Create(node, node.GetHashCode( )))', may result in a transformed tree where each node in the tree contains both the original node and the hash code for that node. The resulting value of applying that operator may be an 'ITree<Tuple<T, int>>' in cases where 'int' is the kind of hash code being produced.

In examples, filtering may the process of traversing nodes of a tree, such as an expression tree, that meet a certain criteria. In certain examples, only the nodes that meet the criteria may be traversed. An example filtering process may be a function that returns boolean value (e.g., true/false) based on a determination of whether a node should be traversed. A filtering function, e.g., 'Func<T, bool> shouldTraverse', may receive a tree variable as input, e.g., 'ITree<T> tree', and may perform filtering of the received tree. As an example, the following filter function, 'tree.Where(node=>shouldTraverse(node))', may return an enumerable sequence of nodes in the tree that "satisfy" (e.g., return true) the 'shouldTraverse' predicate. The result type here may be stored in a container or object, such as IEnumerable<ITree<T>>.

In certain aspects, sorting may be performed. Sorting is similar to filtering, except that the result after filtering is an ordered traversal of the nodes in the tree, based on some function for comparing nodes. The result of applying sorting to a tree may be stored in a container or object, such as IEnumerable<ITree<T>>.

Aggregating may be a process of converting a tree, such as an expression tree, into a singular value, such as, for example, a hash code. An aggregation process may traverse a tree in bottom-up order (i.e., leaf nodes first, traversing up to the root) computing a value for the different nodes or different groups of nodes, e.g., a subtree. In one example, the value computed for a particular node may be combined with values that have been computed for the node's children. Computing hash codes in this manner may provide efficiencies as each hash code for each node is only computed one time when employing a bottom-up traversal.

Grouping may relate to clustering nodes that share a common property, or "key". Given a tree, such as an expression tree, a grouping function may traverse nodes and extract a node's key. The extracted keys may be compared to a target key (or other extracted keys) such that nodes that share the same key may be grouped. The result of a grouping may be an enumerable sequence of groupings of nodes. Each grouping is an enumerable sequence of nodes, along with their shared key, for example, stored in an object such as 'ITreeGrouping<T, TKey>'. In examples, final result of applying a grouping function to the tree is an object representing the grouping such as, for example 'IEnumerable<ITreeGrouping<T, TKey>>'.

One advantage of the aspects described herein results from utilization of a lazy strategy. In examples, a lazy strategy may be an evaluation strategy which delays the evaluation of a hash code until a value is needed. The re-computation behavior resulting from employing variants with hashed nodes is that the sharing likelihood of a node is reflected in the hash code. By constructing a hash code whose low values represent a high likelihood of sharing (e.g., nodes with a constant value such as 1, versus nodes that have a large amount of subtrees each of which are unlikely to be reused), an external table may be utilized to maintain a fixed number of nodes in a cached intern pool that have a high sharing likelihood. Doing so provides a way of caching the top N nodes that are the best candidates for sharing according to a sort based on hash codes. The compositional nature of expression trees provides the ability to generate intern pools sorted based on hash codes. For example, leaf nodes, that is, nodes with no children, may be assigned low numbers such as 1. However, a computation may be performed for determining whether a leaf node that employs one or more constant that is unlikely to be processed frequently enough warrants storing such a node. For example, the payload of a node may be evaluated for complexity. If the payload of the node is complex, then it is less likely that the particular node will be reused. Thus, if the payload is complex, a penalty may be assigned when determining the hash code for the node, thereby altering the particular node's placement in a sort. Nodes assigned lower numbers may be maintained in a cache due to their likelihood of reuse, while nodes assigned higher numbers may be expelled from the cache.

In examples, multiple has codes (or ranking values) may be computed simultaneously when traversing an expression tree. For example, a first hash code may be generated that can be used to capture the signature of the tree (e.g., +*/ meaning a tree with a + operator followed by a * followed by a /) while a second hash code may be generated that can capture the properties of a tree (e.g. the arity of the nodes 2-2-2 or the type-annotated operators +int*int/int). The different hash codes may be generated parallel (e.g., during the same tree traversal) or sequentially. In still other examples, the hash codes may be uncondensed, that is, not a simple integer but a list or other object type. If the hash code is a list, various substring match algorithms may be employed on the list to find matching trees. As such, one of skill in the art will appreciate that multiple hash codes may be computed (e.g., simultaneously or sequentially) and different types of hash codes (e.g., hash codes representing a complex type) may be employed with the aspects disclosed herein without departing from the scope of this disclosure.

According to one example, a query may be received for flight arrival times for a specific flight on an airline (e.g., Virgin Atlantic flight 1893 from Seattle to Denver). In this example, a computation for determining whether the query, represented in an expression tree, should be stored in an intern pool may be performed. As discussed above, a penalty may be assessed based on the specificity of the flight number, the constant 1893, because it is unlikely to be used frequently enough to warrant storing the entirety of the query expression, including the constant. However, sharing nodes associated with such a query in an expression tree that represent null, 0, 1, −1, false, true, and empty string, can result in large savings in the number of duplicated object instances when processing multiple queries. In this example, nodes related to the airline (Virgin Atlantic) flight takeoff location (Seattle) and landing location (Denver) would be likely candidates for sharing as their correlated expressions are more likely to be utilized in processing a larger number of associated queries.

Certain aspects of the present disclosure relate to updating a cached intern pool of expressions which have been stored for sharing. In examples, updating the cached intern pool may occur at assigned periodic intervals. In other examples, updating the intern pool may occur upon receiving a request to update the intern pool. Updating the intern pool may be performed by computing metrics of how often the currently interned nodes are utilized and ranking the interned nodes and/or subtrees in a top-N ranking list accordingly. As discussed above, the ranking may be based on the hash code determined for a particular node or subtree. When an interned node is determined to be one of the less frequently accessed nodes it would correspondingly be placed towards the bottom of the top-N ranking list. For example, a higher hash code may be calculated for the node. Alternatively, if the node is reused, it may be boosted in the rankings to make it less likely for it to be removed from the intern pool of reusable nodes. In examples, boosting the ranking may include modifying of recalculating a hash code for the node. The modified or recalculated hash value may have a lower value, for example, if an ascending sort is used or a higher value if a descending sort is used. As such, examples disclosed herein provide an intern pool that can use metrics related to node reuse across different runs or within a single run, to boost rankings of nodes. In other words, the intern pool may be capable of providing a cache hit bonus to nodes that are frequently reused. While the examples provided herein have been made with respect to a single intern pool, multiple intern pools may be utilized by the different aspects disclosed herein. For example, workloads on a multi-tenant server maybe diverse but they may be similar on a per-tenant basis. In such environments, each tenant may have their own intern pool. Additionally, layers of intern pools may be generated. For example, there may be one or more general intern pools which, for example, may intern trees common to a diverse set of workloads) and one or more fine-grained intern pools, which may intern trees related to a specific function, task, or workload. In such environments, a global intern pool may be searched first and the fine-grained intern pools may be searched if a match is not found in the global intern pool.

According to certain aspects, a computation may be performed for expression tree nodes whereby operands contained within an expression tree relating to a received query are analyzed to determine whether they may be combined into a node that already exists within the intern pool. This may be accomplished by combining the hashes of the operands and the result may be subsequently used to look up a hit for the node in the intern pool. However, if it is determined that one or more operands which undergo this analysis has not been reused from the pool (e.g., it is a node with a complex payload or a complex tree), it may be determined that there is little or no chance of finding a match for a more complex tree. Performing this analysis reduces lookup cost, as well as hashing cost if a node is determined to be unsuitable for reuse. In examples, a node may be unsuitable for reuse if it contains specific payload or specialized constructs that are rarely used.

According to additional examples, various methods may be utilized for making the determination of whether a node is suitable for reuse and assigning the node to an intern pool. For example, a two-phase commit may be performed. That is, a bottom-up phase where constructions try to reuse as much as possible, but do not simultaneously check in newly created nodes to the intern pool. Instead, these nodes may be added to a check-in queue. The check-in queue may be limited in size and have a priority scheme. According to such an example, sibling nodes in a large tree may be ranked against one another prior to being committed to an intern pool. For example, in "(3+4)+(1+2)" the ranking/hash code function may deem that "1+2" has a higher likelihood of reuse than "3+4." In contrast, if interning were performed immediately as new nodes are constructed, "3+4" may cause an eviction from the cache, only to be followed by another eviction when "1+2" comes in. Such a result is detrimental to the performance of an intern pool, especially when concurrent threads are utilized to mutate an intern pool.

In other aspects according to this disclosure, a determination may be made as to whether a node should be made available for re-use. According to examples, this determination may be made according to parameters related to likelihood of re-use, a most frequently used calculation, the amount of memory required to re-use the node, etc.

According to additional non-limiting examples, upon traversing one or more expression tree nodes, a determination may be made as to whether the expressions represented (e.g., string values) within tree nodes are stored in an intern pool. As will be well understood by those of skill in the art, string interning is supported by some modern object-oriented programming languages, including Python, PHP, Lua, Ruby (with its symbols), Java and .NET languages. Lisp, Scheme, and Smalltalk are among the languages with a symbol type that are essentially interned strings. In additional examples, objects other than strings may be interned (e.g., in Java, primitive values that are boxed into wrapper objects).

In examples, upon determining that a tree node is not stored in an intern pool, one or more functions may be executed on at least one of the tree nodes for determining whether at least one of the expressions represented therein may be desirable for storing in an intern pool for sharing amongst a plurality of expression trees. According to some aspects described herein, such a determination may be made by, for example, performing a cost/benefit calculation after determining the memory costs associated with storing at least one sharable node, performing a live metrics analysis to determine how frequently one or more nodes are utilized (e.g., performing a computation that calculates the percentage of queries amongst a number of related queries that utilize that at least one node each time the expression(s) contained therein are accessed) and/or performing an analysis (e.g., a live metrics analysis) to determine whether the at least one node is amongst a most recently used expression tree node for a set of related queries.

According to other aspects, expression tree nodes may be hashed and their corresponding hash code stored in an intern pool. Hashes for operands of one or more expression trees may be combined and the result may be subsequently utilized to determine whether the hash code for the operand(s) has already been interned. However, if it is determined that any of the operands were not reused from the pool, an additional determination may be made as to whether the hashed value for an expression tree node should be interned for later sharing.

In additional examples, upon determining that hash code for one or more nodes is not stored in an intern pool, one or more functions may be executed on one or more of the expression tree nodes for determining whether one or more of the expression tree nodes should be hashed and stored in an intern pool for sharing. According to examples, this determination may be made according to parameters related to likelihood of re-use, a most frequently used calculation, the amount of memory required to re-use the node, etc.

According to other aspects of the present disclosure a determination may be made as to whether one or more nodes of an expression tree is desirable for interning (e.g., whether the costs associated with interning the one or more nodes warrants writing their associated expressions or hash code associated with those expressions to storage). In examples, the determination may be based upon a cost-benefit analysis of expected gains in performance (e.g., memory, CPU, I/O usage) that would result from interning an expression verse the one-time cost of interning the expression.

According to various aspects, normalization may be performed amongst a plurality of expression trees that have matching parameter types. As will be well understood by those of skill in the art, normalization reduces redundant computations involved with processing queries that share equivalent expressions but differ in structure. The role of normalization is to perform rewrites on expressions that make the likelihood of matching certain shared aspects higher. In many cases this may be accomplished utilizing an online scheme (e.g., as a tree is visited in a bottom-up fashion) as described supra with regard to expression hashing for determining matches within an intern pool.

To illustrate the usefulness of normalization the following expressions are introduced by way of example:
new int[ ] {1, 2, 3}.Select(x=>x)
new int[ ] {3, 2, 1}.Select(y=>y)

In the example above, both expressions are semantically equivalent but their syntax differs by way of parameter name only. As will be well understood by those of skill in the art, lambda expressions (i.e. anonymous functions that provides a concise and functional syntax, which are used to write anonymous methods) may be treated as equivalent if their parameter types match, they have the same binding status (bound versus unbound in use sites), and the structure of the expressions match. This property is known as alpha congruence in lambda calculus.

In a further simplification of the above example the following expressions are provided:
Expression<Func<int, int>> f=x=>x
Expression<Func<int, int>> g=y=>y Both expressions may be treated as one and the same as long as the only relevant characteristic being utilized is their runtime behavior (e.g., their string representation is not uniquely relevant).

In further examples, expression trees may be shared based shape. For example, expression trees that have the same or similar shape (or subtrees that have the same or similar shape) may be shared, even if the expression trees do not have the same operations. For example, a node for 1+2 and 3*4 could be shared, effectively by normalizing them to Binary(+, 1, 2) and Binary(*, 3, 4) respectively, and then lifting out constants (note that + and * were turned into constants). This may be beneficial when dealing with simple execution engines.

By performing lambda lifting, e.g., turning constant nodes, or possibly more complex nodes into unbound parameters, certain portions of expressions such as those above may be reused through normalization as described supra. This concept may be further explained by the following expressions:
((a, b, c)=>new int[] {a, b, c}.Select(x=>x))(1, 2, 3)
((a, b, c)=>new int[] {a, b, c}.Select(y=>y))(3, 2, 1)

In this example, the inner lambda expressions may be reused because their bodies match (recursively), and the only node that is different between the two expressions is the top-level invocation expression.

According to additional examples of the present disclosure, normalization of expression trees may be performed utilizing De Bruijn indices. As will be understood by those of skill in the art, a De Bruijn index is a notation for representing terms in lambda calculus with the purpose of eliminating names of variables according to an index-based scheme. Utilizing this concept, lexical matching equals semantic matching, and parameter names are no longer of concern. Utilizing this technique, leaf nodes that represent parameters with low values based on their "distance" may be hashed. That is parameters that are in a near scope are going to be a part of smaller trees (e.g., they do not refer to "far" parameters). Thus, the whole lambda likely has a higher probability of use. This process is useful for eliminating the storage costs associated with interning portions of expression trees that do not provide a substantial or sufficiently desirable benefit in relation to processing expressions amongst multiple queries having shared parameters.

According to one aspect according to the present disclosure, normalization may be performed amongst a plurality of expressions within one or more expression trees and may comprise reusing at least one inner lambda expression (an anonymous function that provides a concise and functional syntax, which is used to write anonymous methods) amongst the plurality of expressions within the one or more expression trees.

Additional methods and systems for performing interning of expression trees as described herein may be performed as described in the examples below.

Expression equality comparisons may detect inequalities quickly due to the presence of pre-computed hash codes. Even when the hashing of trees is unlikely to provide substantial benefit, e.g. because the likelihood of reuse is determined to be low, a thunk can be put in place. As used herein, a "thunk" refers to a subroutine (i.e. a sequence of instructions that perform a specific task, packaged as a unit, which can be utilized in performing operations wherever that particular task should be performed) that is created, often automatically, to assist a call to another subroutine.

According to examples described herein, thunks may be utilized to represent an additional calculation that a subroutine needs to execute, or to call a routine that does not support the usual calling mechanism. Upon any facility needing a hash code, the result can be computed and stored in a node and/or of the subtrees the node refers to. In addition, a thunk may call into an interning computation where the node may be concurrently ranked as a better candidate for future reuse and subsequently be added to an intern pool regardless of whether a determination has been made not to store it in an intern pool. For example, a thunk may be utilized if a node was not previously interned due to early termination of the interning process or it has been determined that "better" trees (or pieces thereof) have already being cached within an intern pool.

In additional examples, in evaluating an expression tree, it may be determined that one or more nodes may not be desirable for interning due to dynamic conditions at runtime. Compilation of subtrees may be deferred until first execution, making only one execution of a subtree's logic in a larger tree desirable to obtain a compiled plan. Such deferment may provide an improvement over interning methods that employ an initial once-per-tree compilation and storage cost calculation of all subtrees.

It will be understood by those of skill in the art that various other strategies for intern pool clean-up may be devised. Such strategies may take into account the number of current users of any given node in the pool (e.g., a ref count scheme), employ ranking algorithms, leverage a mostly used (MRU) strategy, and/or performing occasional inversion.

Examples disclosed herein may be implemented as a computer process, a computing system, or as an article of manufacture such as a computer program product or non-transitory computer readable media. The computer program product may be a computer storage media readable by a computer system and encoding a computer program of instructions for executing a computer process.

Prior solutions lacked the specificity of the methods and systems described herein. Those prior solutions analyzed entire expression trees representing full queries, and would therefore store entire expression trees if a determination was made that the entire tree was likely to be reused. Because of this, the prior solutions stored unnecessarily large amounts of data comprised of entire expression trees. As such, prior solutions resulted in longer computation times when multiple similar, but not identical, queries were processed. The aspects disclosed herein provide numerous technical benefits over prior solutions. For example, according to aspects described herein, interning of certain portions of expression trees that have the same semantics allows for a reduction of the amount of memory needed to cache an intern pool, as well as limiting computation lookup costs associated with determining whether certain expressions contained within nodes in an expression tree are suitable for reuse. While specific benefits are described herein, one of skill in the art will recognize that other benefits are achieved through use of the systems and methods disclosed herein.

In view of the exemplary systems and methods described supra, methodologies that may be implemented in accordance with the disclosed subject matter will be better appreciated with reference to the flowchart of FIG. 1. While for purposes of simplicity of explanation, the methodologies are shown and described as a series of operations, some operations may occur in different orders and/or concurrently with other operations from what is depicted and described herein. Moreover, not all illustrated operations may be required to implement the methods described hereinafter.

Referring to FIG. 1, a flowchart representing an exemplary method 100 for interning expression trees is provided. Flow beings at operation 102 where a plurality of hash codes are recursively computed for a plurality of expression tree nodes. Upon computing hash code for the plurality of expression tree nodes flow continues to operation 104 where a determination is made as to whether at least one of the plurality of expression tree nodes should be stored in a cached intern pool.

Flow continues to operation 106 where a computing device determines whether hash code for each of the plurality of expression tree nodes is stored in a cache. Upon making this determination flow continues to 108. At 108 an operation is performed to determine whether at least one expression tree node associated with at least one of the plurality of expression trees from a cache should be evicted. Such a determination may be made by, for example, performing one or more of the following: analyzing the storage costs associated with interning the at least one shared node 112, calculating how frequently the at least one node has been utilized 114, and/or making a determination as to whether the at least one node is amongst a most recently used node 116. Other operations may be performed in making the determination as to whether at least one shared node associated with at least one of the plurality of expression trees from the cached intern pool should be evicted as described herein.

Flow continues to operation 110 after performing one or more of operations 112, 114 or 116, and one or more shared nodes associated with at least one of a plurality of expression trees may be evicted from a cached intern pool.

Figure 2:
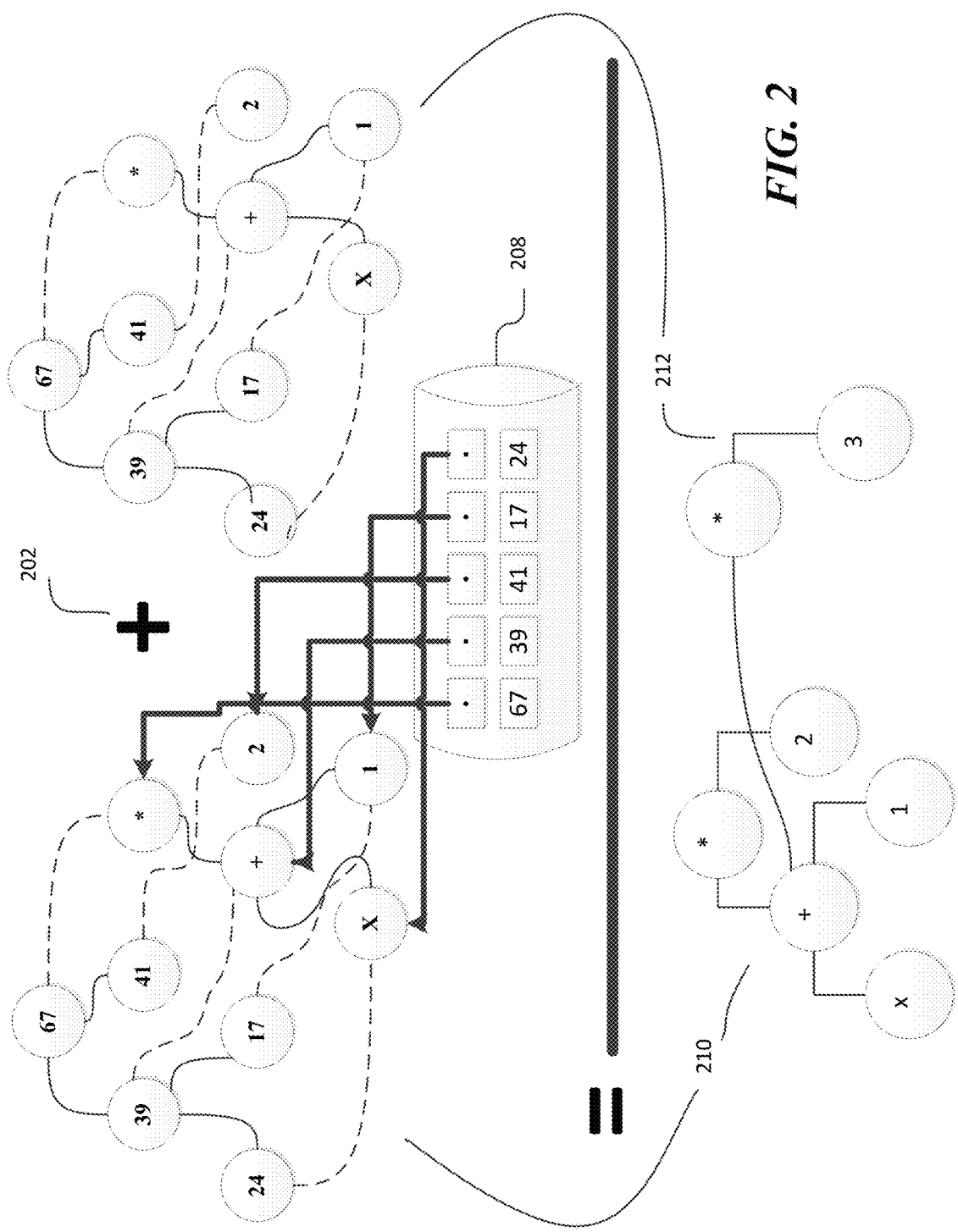
FIG. 2 illustrates an exemplary process for interning an expression tree by consulting an intern cache.

Turning to FIG. 2, the process of interning an expression tree by consulting a cached intern pool is depicted. A first expression tree 210 is interned at 202 with second expression tree 212 utilizing cached intern pool 208. As depicted in FIG. 2, hash codes are calculated for the first expression tree 210. The nodes of the first expression tree 210 are stored in an intern pool 208 based upon their calculated hash codes. In the depicted example, the nodes representing "x+1" are calculated to have hash values of "24," "39," and "17," respectively. The nodes, identified by their unique hash value, are placed in the intern pool. When the expression 212 is evaluated, the hash values "24," "39," and "17" are again determined for the subtree representing "x+1." Because these nodes were already placed in the intern pool when constructing the first expression tree 210, the interned nodes can be used during the construction of the second expression tree 212. Thus, as illustrated, the expression tree 210 reuses the interned nodes representing "x+1" instead of creating and storing duplicate nodes, thereby reducing the amount of storage and memory needed to store and process the first expression tree 210 and the second expression tree 212.

Figure 3:
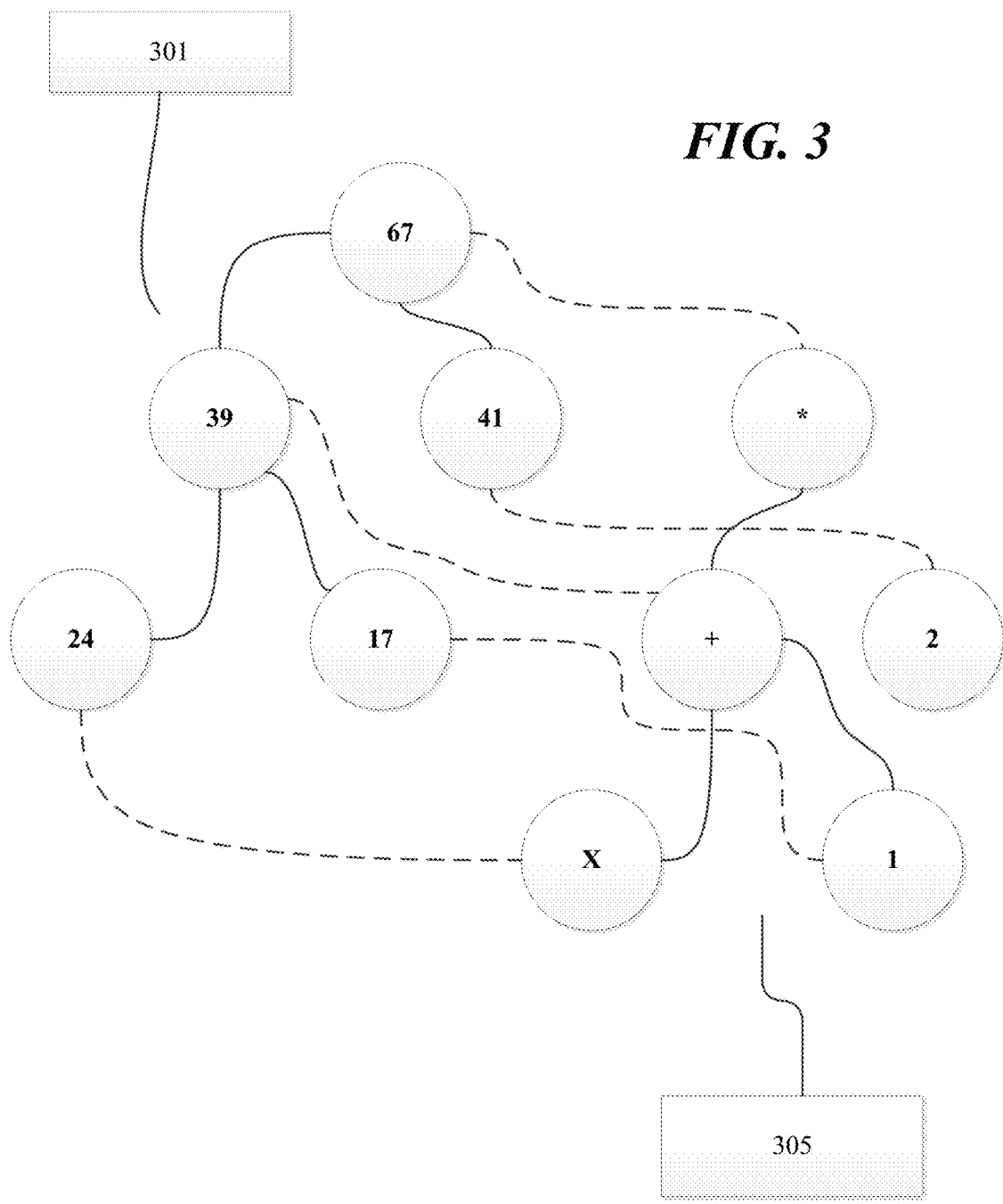
FIG. 3 is a simplified diagram showing the projection of an expression tree onto an overlay tree with hash values for the original expression tree's nodes.

Turning to FIG. 3, a projection of a tree onto an "overlay" tree with hash values for the original tree's nodes is provided. Hash values depicted therein are only provided by way of example and ease of illustration. Nodes 301 are exemplary of hashed nodes (Tree<Hashed<T>>) from original tree nodes 305 (Tree<T>). FIG. 3 provides a visual representation of having applied a projection on a tree (Tree<T>) into a hashed node (Tree<Hashed<T>>). The solid lines in the diagram represent parent-child relationships in the tree, and the dashed lines represent an object reference relationship. Nodes 301 may be generated in bottom-up order, such that the Hashed<T> value that was produced from each node in node set 305. By using an overlay tree, cost of computing hash codes on trees is reduced by minimizing the amount of data copying (which a typical cost in immutable data structures).

Figure 4:
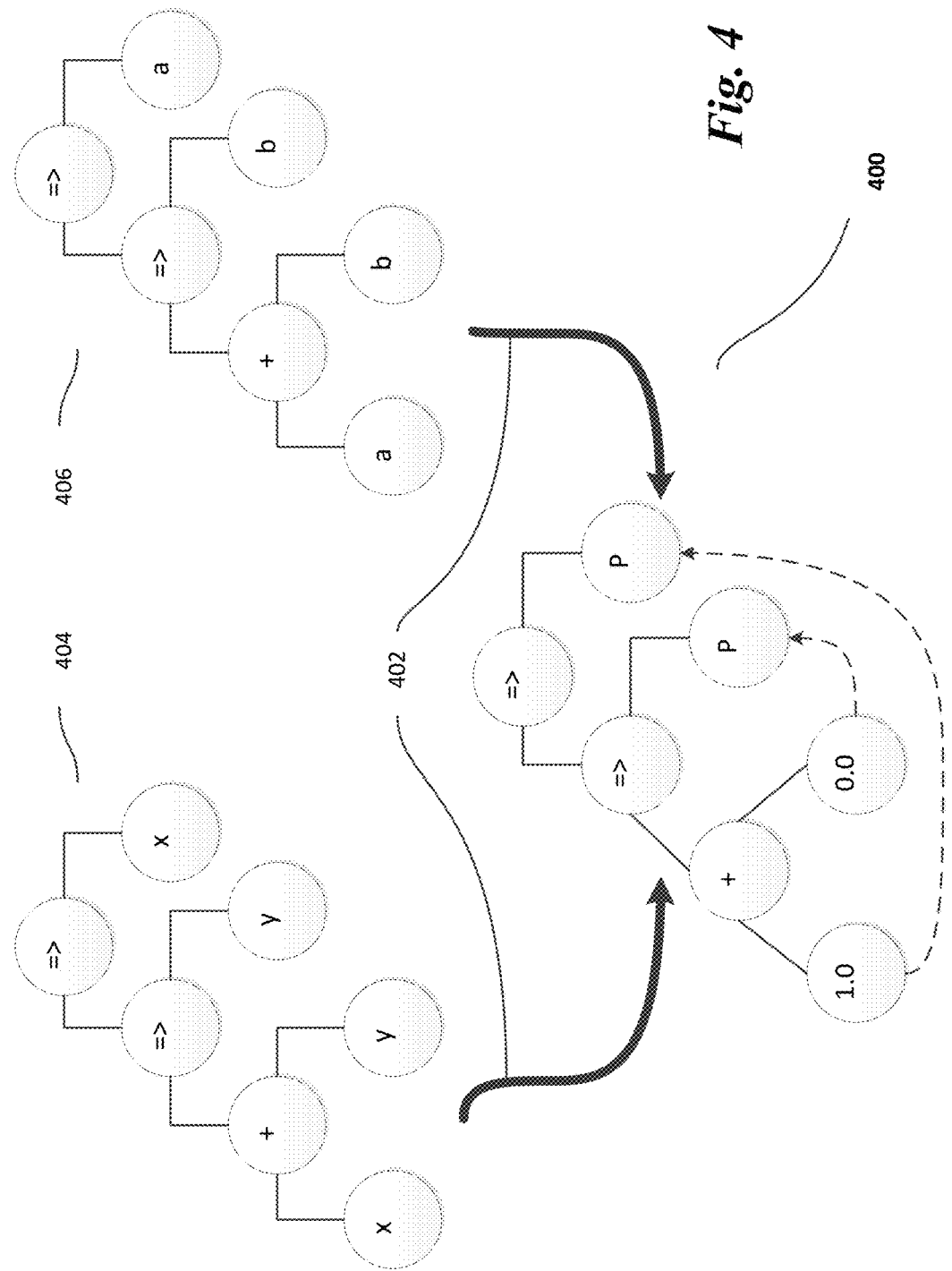
FIG. 4 is a simplified diagram showing normalization of expression tree nodes utilizing De Bruijn indices.

Turning to FIG. 4, an exemplary projection of expression tree normalization employing De Bruijn indices is provided. As illustrated and more fully described supra, normalization 402 of subtree nodes 404 and 406 utilizing De Bruijn indices results in normalized subtree nodes 400. FIG. 4 provides a visual representation of an exemplary normalization that may be applied to expression trees to improve the likelihood of cache hits in an expression tree interning cache. As depicted in FIG. 4, expression trees 404 and 406 are semantically equivalent, but differ syntactically in that the choice of parameter names are different. Using De Bruijn indices, the expressions represented by expression trees 404 and 406 may be normalized by replacing bound parameter expressions with an expression based on the De Bruijn index of the parameter. Applying such a normalization (represented by the arrows 402) to the expression trees 404 and 406 results in the syntactically equivalent expression tree 400. The declared parameters in the lambda expressions become unnamed parameter nodes labeled "P", and the previous references to those parameter nodes in the binary "+" expression are replaced with the De Bruijn indices. The left sub-expression of the binary "+" expression is replaced by "1.0", representing the fact that the parameter comes from the lambda scope "1" and is the "0"-th parameter from that scope (note that the De Bruijn indices in this case are zero-based). The right sub-expression is replaced by "0.0", representing that the parameter comes from lambda scope "0" and is the "0"-th parameter from that scope. The dashed lines provide an explicit indicator of the parameter represented by the De Bruijn indices. While specific De Bruijn index vales are described herein, one of skill in the art will appreciate that other values may be used without departing from the scope of this disclosure.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
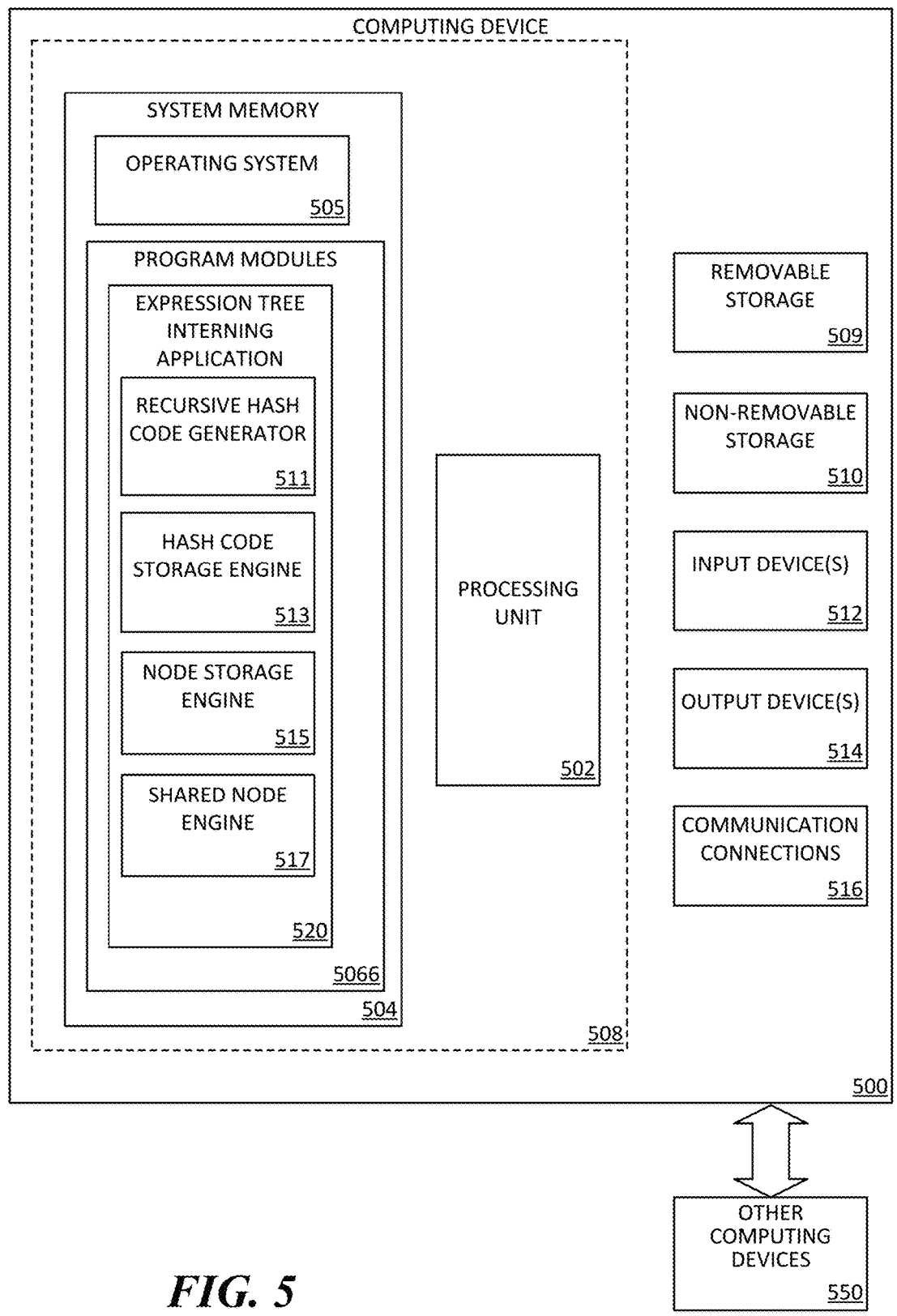
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for recursively computing hash code for a plurality of expression tree nodes, determining whether hash code for each of the plurality of expression tree nodes is stored in a cached intern pool, and upon determining that at least one of the plurality of expression tree nodes is not stored in the cached intern pool, running at least one function on the at least one of the plurality of expression tree nodes for determining whether that at least one of the plurality of expression tree nodes should be stored in the cached intern pool, on a server computing device such as, for example, server 820, including computer executable instructions for expression tree interning application 520 that can be executed to employ the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more sets of instructions 506 suitable for executing an expression tree interning application 520 when executed by processing unit 502, for example, by the execution of the exemplary instructions for recursive hash code generation 511, instructions for hash code storage 513, instructions for node storage 515, and/or instructions for determining a shared node 517. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of computer executable instructions and/or data files may be stored in the system memory 504. While executing on the processing unit 502, computer executable instructions (e.g., expression tree interning application 520) may perform processes including, but not limited to, the various aspects, as described herein. Other program modules (i.e., sets of computer executable instructions) may be used in accordance with aspects of the present disclosure, for example exemplary instructions for recursive hash code generation 511, instructions for hash code storage 513, instruction for node storage 515, instructions for determining a shared node 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
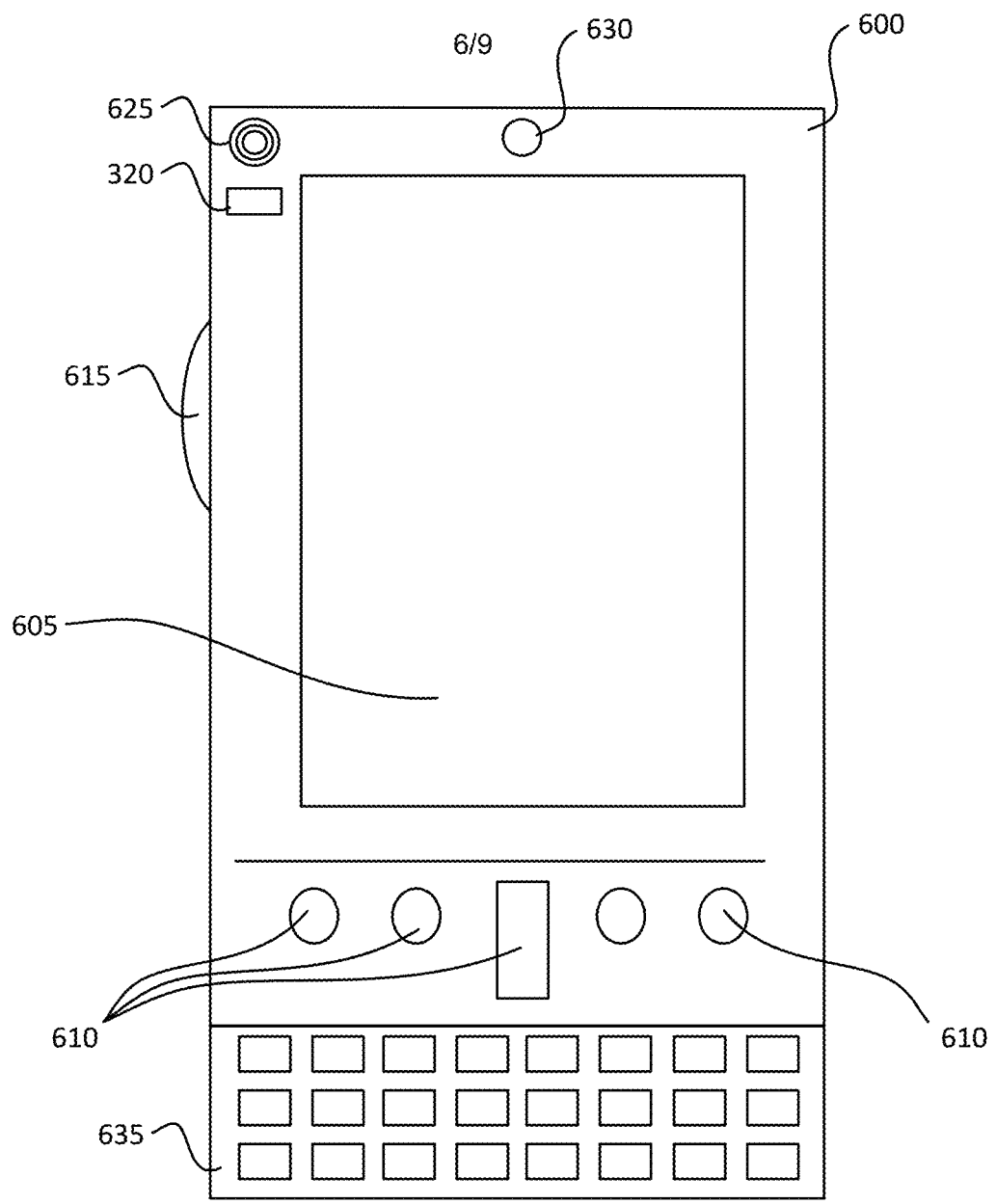
FIGS. 6A and 6B are simplified block diagrams of a mobile computing device with which aspects of the present disclosure may be practiced.
Figure 6B:
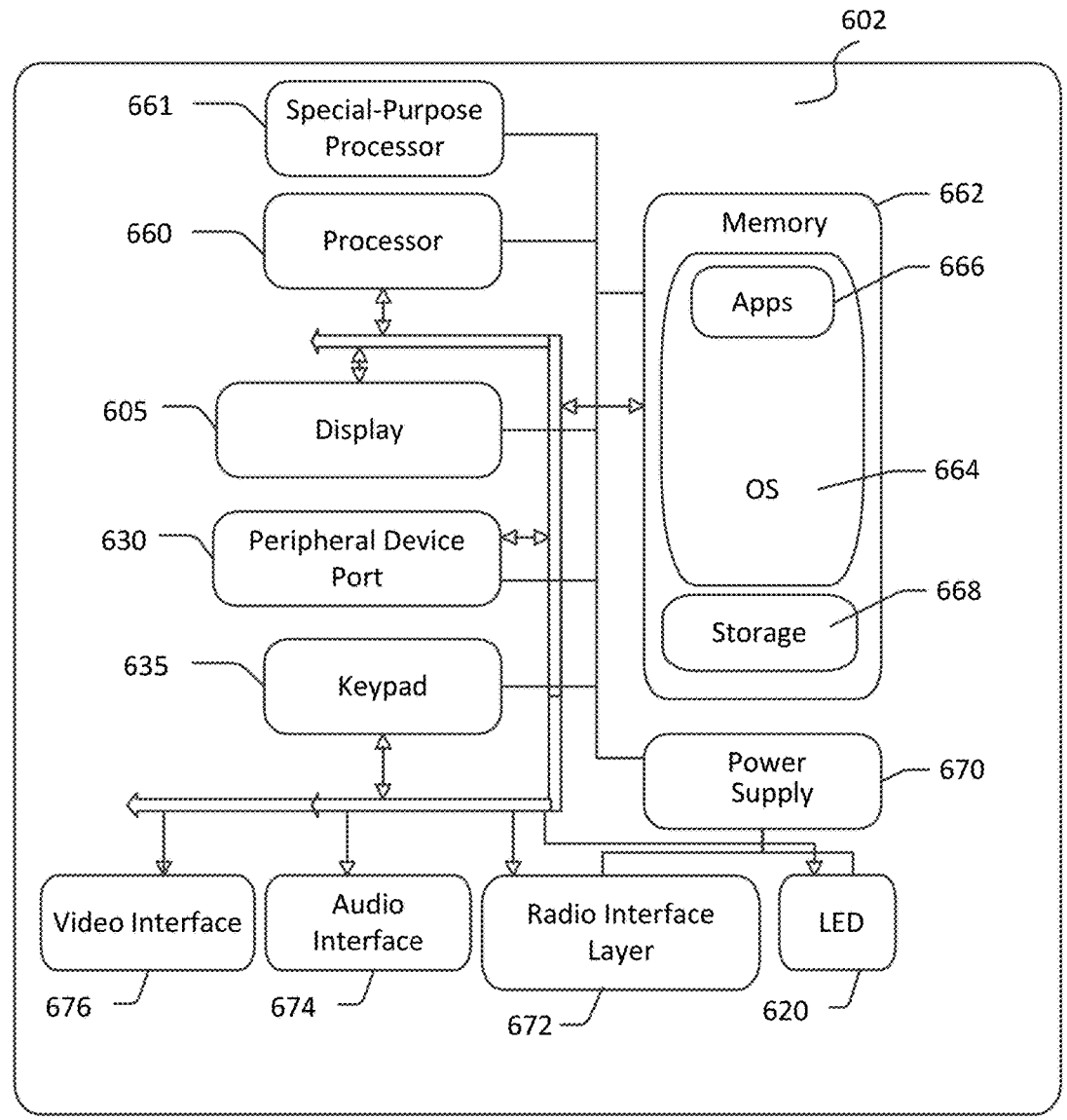

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, an execution engine, and/or media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for performing interning of expression trees as described herein (e.g., recursive hash code generator, hash code storage engine, node storage engine, shared node engine, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
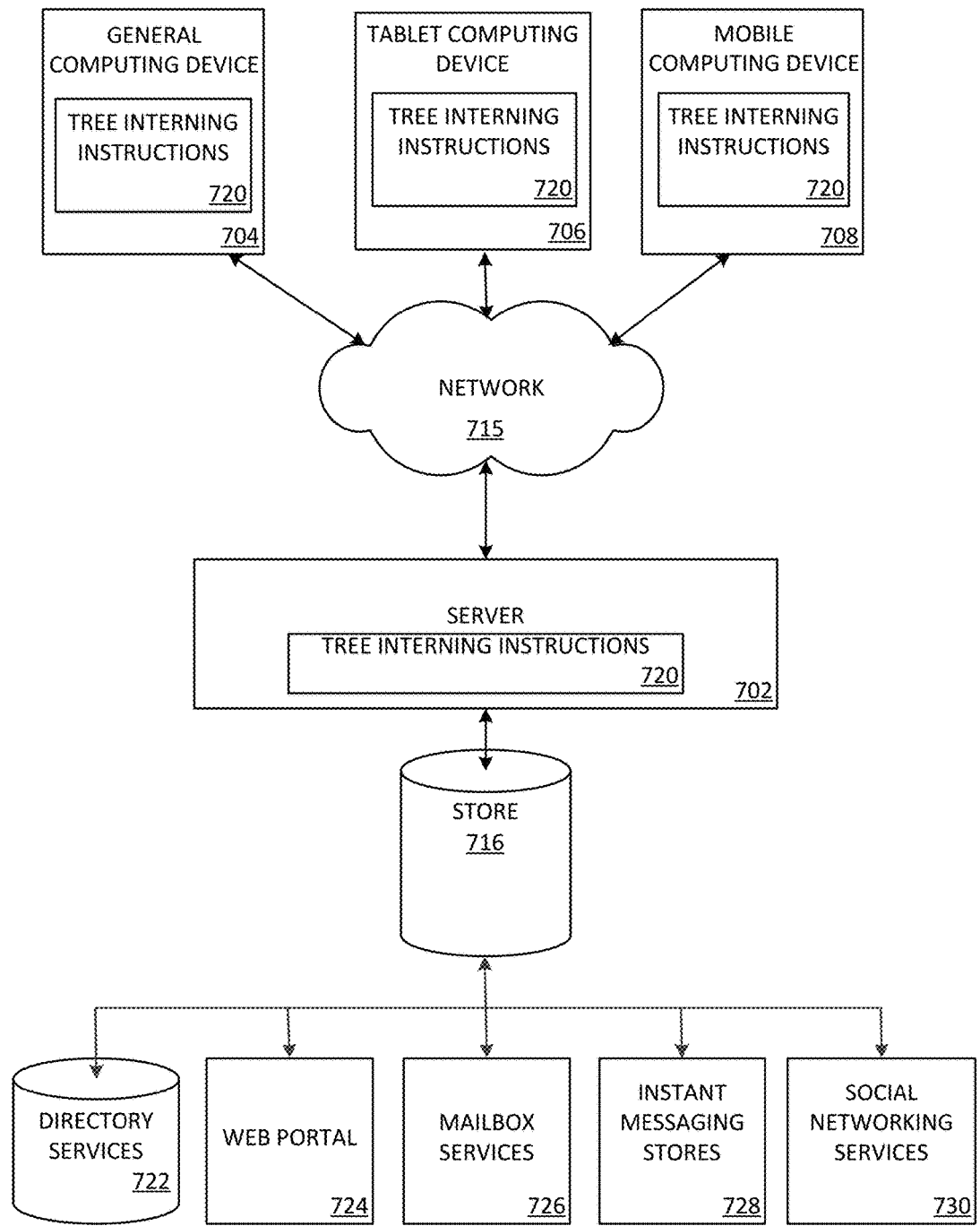
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. The instructions for performing the expression tree interning 720 may be employed by a client that communicates with server device 702, and/or the instructions for performing expression tree interning 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above with respect to FIGS. 5-6 may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
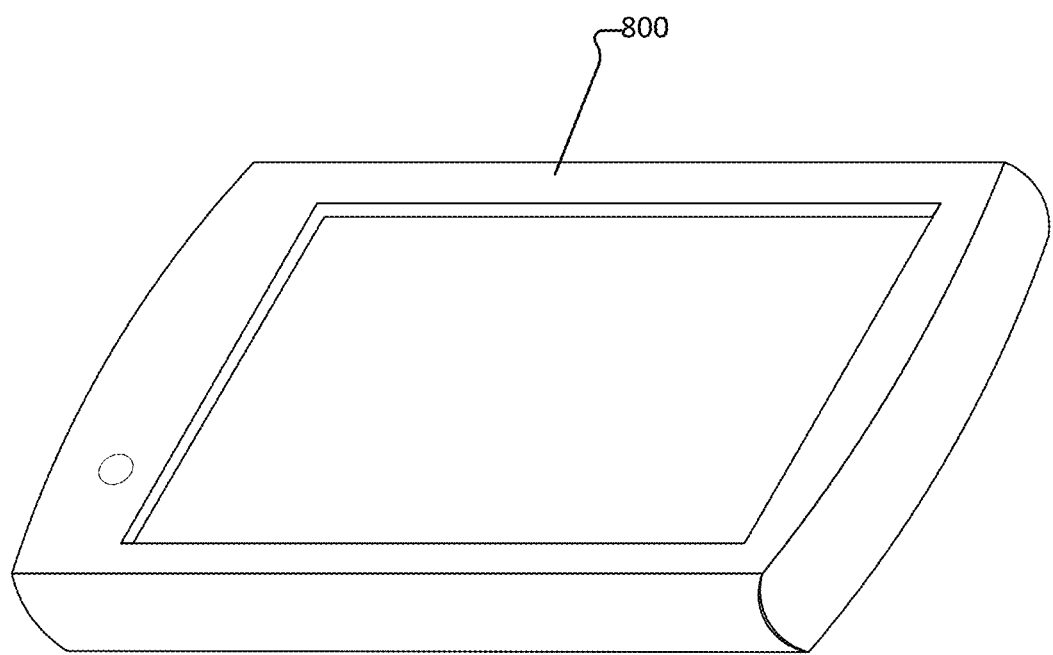
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A system comprising:
   at least one processor; and
   a memory operatively connected with the at least one processor, the memory comprising computer executable instructions that, when executed by the at least one processor, perform a method comprising:
   recursively computing hash code for a plurality of expression tree nodes of an expression tree;
   determining whether hash code for each of the plurality of expression tree nodes is stored in a cache;
   upon determining that at least one of the plurality of expression tree nodes is not stored in the cache, determining whether the at least one of the plurality of expression tree nodes should be stored in the cache; and
   based on the determination, storing the at least one of the plurality of expression tree nodes in the cache, wherein the at least one of the plurality of expression tree nodes stored in the cache may be reused to construct additional expression trees.

2. The system according to claim 1, further comprising normalizing the expression tree prior to recursively computing the hash code.

3. The system according to claim 1, further comprising, determining that at least one node of the expression trees is sharable amongst a plurality of expression trees.

4. The system according to claim 3, wherein determining that at least one node of the expression tree is sharable amongst the plurality of expression trees further comprises determining whether the at least one sharable node of the expression tree is desirable to share.

5. The system according to claim 4, wherein determining whether the at least one sharable node of the expression tree is desirable to share further comprises:
   analyzing the memory costs associated with storing the at least one sharable node; and
   performing a live metrics analysis to determine how frequently the at least one sharable node is utilized.

6. The system according to claim 5, further comprising performing a live metrics analysis to determine whether the at least one sharable node is amongst a most recently used expression tree node.

7. The system according to claim 3, wherein upon determining that at least one node of the expression tree is sharable amongst a plurality of expression trees, determining whether at least one shared parameter associated with at least one of the plurality of expression trees from the cache should be evicted.

8. The system according to claim 7, further comprising evicting at least one shared parameter associated with at least one of the plurality of expression trees from the cache.

9. A computer-implemented method for interning expression trees comprising:
   recursively computing at least one hash codes for a plurality of expression tree nodes of an expression tree;
   determining whether the at least one hash code for each of the plurality of expression tree nodes is stored in one or more intern pools;
   upon determining that at least one of the plurality of expression tree nodes is not stored in the one or more intern pools, running at least one function on at least one of the plurality of tree nodes for determining whether the at least one of the plurality of expression tree nodes should be stored in the one or more intern pools; and
   based on the determination, storing the at least one of the plurality of expression tree nodes in the one or more intern pools, wherein the at least one of the plurality of expression tree nodes stored in the cache may be reused to construct additional expression trees.

10. The computer-implemented method according to claim 9, further comprising performing normalization amongst the plurality of expression trees that have matching parameter types.

11. The computer implemented method according to claim 10, wherein performing normalization amongst the plurality of expression trees further comprises reusing at least one inner lambda expression for at least one portion of at least one of the plurality of expression trees.

12. The computer implemented method according to claim 11, wherein performing normalization amongst the plurality of expression trees further comprises utilizing De Bruijn indices to erase lambda parameters based on names by an index-based scheme.

13. The computer implemented method according to claim 9, further comprising, determining that at least one node of the expression trees is sharable amongst a plurality of expression trees.

14. The computer implemented method according to claim 13, wherein determining that at least one node of the expression tree is sharable amongst a plurality of expression trees further comprises determining whether the at least one sharable node of the expression tree is desirable to share.

15. The computer implemented method according to claim 14, wherein determining whether the at least one sharable node of the expression tree is desirable to share further comprises:
 analyzing the memory cost associated with storing the at least one sharable node; and
 performing a live metrics analysis to determine how frequently the at least one sharable node is utilized.

16. The computer implemented method according to claim 15, further comprising performing a live metrics analysis to determine whether the at least one sharable node is amongst a most recently used expression tree node.

17. The computer implemented method according to claim 13, wherein upon determining that at least one node of the expression tree is sharable amongst a plurality of expression trees, determining whether at least one shared parameter associated with at least one of the plurality of expression trees from the cache should be evicted.

18. The computer implemented method according to claim 17, further comprising evicting at least one shared parameter associated with at least one of the plurality of expression trees from the cache.

19. The computer implemented method according to claim 17, wherein determining whether at least one shared parameter associated with at least one of the plurality of expression trees from the cache should be evicted further comprises:
 analyzing the memory cost associated with storing the at least one shared parameter; and
 calculating how frequently the at least one shared parameter has been utilized.

20. A computer-storage medium encoding computer executable instructions that, when executed by at least one processor, perform a method for interning expression trees comprising:
 recursively computing hash code for a plurality of expression tree nodes of an expression tree;
 determining whether hash code for each of the plurality of expression tree nodes is stored in an intern pool;
 upon determining that at least one of the plurality of expression tree nodes is not stored in the intern pool, running at least one function on at least one of the plurality of tree nodes for determining whether the at least one of the plurality of expression tree nodes should be stored in the intern pool; and
 based on the determination, storing the at least one of the plurality of expression tree nodes in the intern pool, wherein the at least one of the plurality of expression tree nodes stored in the cache may be reused to construct additional expression trees.

* * * * *